US012756299B2

(12) United States Patent
Epp et al.

(10) Patent No.: US 12,756,299 B2
(45) Date of Patent: Oct. 6, 2026

(54) SERIES POWER FACTOR CORRECTION BOOST CONVERTER AND METHOD

(71) Applicant: ROCKWELL COLLINS, INC., Cedar Rapids, IA (US)

(72) Inventors: Matthew T. Epp, Marion, IA (US); Jeff J. Deloy, Central City, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 148 days.

(21) Appl. No.: 18/931,690

(22) Filed: Oct. 30, 2024

(65) Prior Publication Data

US 2026/0121522 A1 Apr. 30, 2026

(51) Int. Cl.

| | |
|---|---|
| ***H02M 1/42*** | (2007.01) |
| ***H02M 1/00*** | (2006.01) |
| ***H02M 1/44*** | (2007.01) |
| ***H02M 3/158*** | (2006.01) |

(52) U.S. Cl.

CPC ......... *H02M 1/4225* (2013.01); *H02M 1/007* (2021.05); *H02M 1/44* (2013.01); *H02M 3/158* (2013.01)

(58) Field of Classification Search

CPC ...... H02M 1/4225; H02M 1/007; H02M 1/44; H02M 3/158; H02M 1/4233; H02M 1/4266; H02M 1/4275; H02M 1/4283; H02M 1/4291; H02M 1/0074; H02M 1/0077; H02M 1/008; H02M 3/1582; Y02B 70/10

See application file for complete search history.

(56) References Cited

U.S. PATENT DOCUMENTS

2011/0038189 A1 2/2011 Whittam et al.
2012/0051097 A1 3/2012 Zhang et al.
2016/0057825 A1 * 2/2016 Hu ........................ H05B 45/325 315/201
2018/0115246 A1 4/2018 Azrai et al.

FOREIGN PATENT DOCUMENTS

CN 102214994 A 10/2011
CN 112994429 A 6/2021
CN 117833666 A 4/2024

* cited by examiner

*Primary Examiner* — Jung Kim
(74) *Attorney, Agent, or Firm* — Christopher B. Kilner; MILLEN, WHITE, ZELANO & BRANIGAN, P.C.

(57) ABSTRACT

A high voltage direct current (DC) power supply applies an alternating current (AC) concept of power factor correction (PFC) to supply DC voltage using a series PFC boost converter. Multiple series DC/DC boost converters are controlled using voltage feedback from the filtered voltage input in each PFC boost stage to stabilize the DC input voltage and achieve a large step-up voltage ratio. Input voltage feedback is utilized by the controllers in all boost stages of the PFC boost converter so as to appear resistive and compensate for the DC source impedance, which significantly reduces the amount of damping capacitance needed by the system.

20 Claims, 5 Drawing Sheets

SERIES POWER FACTOR CORRECTION BOOST CONVERTER AND METHOD

FIELD OF THE INVENTION

The subject matter disclosed herein relates to regulation of power supplies and, in particular, to a series power factor correction boost converter and method for a power supply.

BACKGROUND OF THE INVENTION

Some switching power supplies, such as those used in aerospace or military applications (see, e.g. MIL-STD-461 and/or MIL-STD-704), generate high voltage to continue supplying power during an input interruption while maximizing energy density of the holdup capacitors. The high voltage often exceeds a level which can be effectively regulated with a single boost converter, so a different architecture is needed. Additionally, high impedance power inputs require sizable damping input capacitance to maintain input stability. The control method is often performed using independent boost controllers for every stage.

With reference to FIG. 1, a schematic diagram of a boost converter 10 is illustrated. The boost converter 10 topology forms the basis for most step-up regulators and includes an electromagnetic interference (EMI) filter portion 12 and a boost portion 14. In FIG. 1, transistor Q1 (e.g., a metal oxide semiconductor field effect transistor (MOSFET)) receives a pulse width modulated (PWM) signal 1 from the controller 16 to regulate its output voltage. Boost converter 10 includes the use of two large capacitors C1 and C3, typically in the form of aluminum electrolytic capacitors, with one in each of EMI filter portion 12 and boost stage 14. High step-up ratios become less practical for the boost converter 10 because the PWM duty cycle gets very high.

With reference to FIG. 2, a schematic diagram of a tapped-inductor boost converter 20 is illustrated. The tapped-inductor boost converter 20 is a common prior approach of achieving a higher step-up ratio. Tapped-inductor boost converter 20 also includes the use of two large capacitors C1 and C3, typically in the form of aluminum electrolytic capacitors, with one in each of EMI filter portion 22 and boost stage 24. The only difference between the tapped-inductor boost converter 20 and the boost converter 10 of FIG. 1 is that the inductor L2 in tapped-inductor boost converter 20 has a second winding in the boost stage 24, which increases the converter's voltage gain (N1+N2)/N1, reducing duty cycle relative to the boost converter 10 topology. However, the coupled inductor's parasitic inductance and Q1's parasitic capacitance cause ringing, which increases emissions and snubbing losses. Furthermore, the input current waveform has additional high-frequency harmonic content due to the current waveform being chopped.

With reference to FIG. 3, a schematic diagram of a series boost converter 30 is illustrated. The series boost converter 30 topology is a quieter approach than the tapped-inductor boost converter 20 topology that places two boost stages 34 and 35 in series, each having controllers 36 and 37, respectively. This has the potential to practically achieve higher output voltages than a tapped-inductor boost stage 24 with less voltage stress on the transistors Q1 and Q2 and the rectifiers D1 and D2. The downside of this approach is the added complication and size of multiple converter stages, each with their own large bulk capacitance (C1, C3, C5). Additionally, this approach has the most capacitance to charge at turn on, so controlling inrush current can require a more complicated design and extend startup.

With reference to FIG. 4, the most common control method for each of boost converter 10, tapped-inductor boost converter 20, and series boost converter 30 is a current mode control topology 40 (including peak or average current mode control), which generates a voltage error signal (VEA) 42, then compares the VEA 42 to the inductor current 44 to determine PWM duty cycle 46. This control method works well to regulate the output and reject input AC noise, but its response causes the boost converter 10, 20, or 30 to look like a negative impedance to the source such that lower input voltage results in higher input current draw. In a DC system with high input impedance, this interaction requires C1 to be large to prevent an input voltage oscillation.

The above information disclosed in this Background section is only for understanding of the background of the inventive concepts and, therefore, it may contain information that does not constitute prior art.

SUMMARY OF THE INVENTION

The present disclosure is directed, in a first aspect, to a series power factor corrector (PFC) boost converter for providing a direct current (DC) voltage. The series PFC boost converter includes an electromagnetic interference (EMI) filter having a first inductor, a first capacitor connected to ground through a first resistor, and a second capacitor connected to ground, the EMI filter configured to receive an input voltage and pass it through the first inductor. The series PFC boost converter also includes: a first PFC boost stage with a first input connected to an output of the EMI filter, the first PFC boost stage including a second inductor, a first field effect transistor, a first rectifier, a third capacitor connected to ground through a second resistor, and a fourth capacitor connected to ground; a second PFC boost stage with a second input connected to an output of the first PFC boost stage, the second PFC boost stage including a third inductor, a second field effect transistor, a second rectifier, a fifth capacitor connected to ground, and a sixth capacitor connected to ground; a first PFC boost controller having inputs configured to receive the input voltage (IN), a first sensed current through the second inductor, and a first output voltage (MID) of the first PFC boost stage, the first PFC boost controller further having a first output to provide a first pulse width modulated (PWM) signal to the first field effect transistor; and a second PFC boost controller having inputs configured to receive the input voltage (IN), a second sensed current through the third inductor, and a second output voltage (OUT) of the second PFC boost stage, the second PFC boost controller further having a second output to provide a second PWM signal to the second field effect transistor.

In one or more embodiments of the series PFC boost converter, each of the first and second PFC boost controllers may include a respective control circuit configured to use a PFC equation to calculate MULT:

$$MULT = \frac{VEA \times IN}{VRMS^2}$$

wherein: VEA=Voltage Error Amplifier output;

IN=scaled input voltage; and

VRMS=scaled input voltage with low pass filter; and compare MULT with a respective sensed current to result in a respective current error amplifier (CEA) output; and compare the respective CEA output with a sawtooth oscillator output to produce each respective PWM control signal.

In an embodiment of the series PFC boost converter, each respective control circuit may include an op-amp or a digital controller with an input for a reference voltage, an input for the respective output voltage of a respective PFC boost stage, and a VEA output.

In another embodiment of the series PFC boost converter, each respective control circuit may include a first multiplier to multiply the VEA output by the scaled input voltage to provide a numerator.

In a further embodiment of the series PFC boost converter, each respective control circuit may include a second multiplier to multiply the VRMS by the VRMS to provide a denominator.

In yet another embodiment of the series PFC boost converter, each respective control circuit may include a divider to divide the numerator by the denominator to calculate MULT.

In an embodiment of the series PFC boost converter, each of the first and second PFC boost stages may include: the respective inductor connected in series with the respective rectifier; the respective field effect transistor connected to ground between the inductor and rectifier; and the respective capacitors connected to ground between the rectifier and the output of the respective PFC boost stage.

In another embodiment of the series PFC boost converter, respective output voltages input to respective PFC boost controllers may be taken from between respective capacitors of each PFC boost stage.

The present disclosure is also directed, in a second aspect, to a series power factor corrector (PFC) boost converter method for providing a direct current (DC) voltage. The method includes: providing an input DC voltage to a first PFC boost stage as input voltage (IN); boosting the DC voltage at the first PFC boost stage through a second inductor, a first field effect transistor, a first rectifier, a third capacitor connected to ground, and a fourth capacitor connected to ground; boosting the DC voltage at a second PFC boost stage through a third inductor, a second field effect transistor, a second rectifier, a fifth capacitor connected to ground, and a sixth capacitor connected to ground; controlling the first PFC boost stage with a first PFC boost controller having inputs receiving the input voltage (IN), a first sensed current through the second inductor, and a first output voltage (MID) of the first PFC boost stage, and outputting a first pulse width modulated (PWM) signal to the first field effect transistor; and controlling the second PFC boost stage with a second PFC boost controller having inputs receiving the input voltage (IN), a second sensed current through the third inductor, and a second output voltage (OUT) of the second PFC boost stage, and outputting a second PWM signal to the second field effect transistor.

In an embodiment, the providing the input DC voltage may include providing electromagnetic interference (EMI) filtering of the input DC voltage by passing the input DC voltage through a first inductor and to the first PFC boost stage via a line having a first capacitor connected to ground through a first resistor, and a second capacitor connected to ground In an embodiment of the method, each of the first and second PFC boost controllers may use a PFC equation to calculate MULT:

$$MULT = \frac{VEA \times IN}{VRMS^2}$$

wherein: VEA=Voltage Error Amplifier output;

IN=scaled input voltage; and

VRMS=scaled input voltage with low pass filter; and compare MULT with a respective sensed current to result in a respective current error amplifier (CEA) output; and compare the respective CEA output with a sawtooth oscillator output to produce each respective PWM control signal.

In another embodiment of the method, each respective PFC boost controller may receive an input for a reference voltage, an input for the respective output voltage of a respective PFC boost stage, and calculate a VEA output.

In a further embodiment of the method, each respective PFC boost controller may multiply the VEA output by the scaled input voltage to provide a numerator, and each respective PFC boost controller may multiply the VRMS by the VRMS to provide a denominator.

In an embodiment of the method, each respective PFC boost controller may divide the numerator by the denominator to calculate MULT.

The present disclosure is further directed, in a third aspect, to a series power factor corrector (PFC) boost controller for a direct current (DC) power supply. The series PFC boost controller includes: a first input configured to receive an input voltage (IN) of a series PFC boost converter from an electromagnetic interference (EMI) filter of the series PFC boost converter; a second input configured to receive a sensed current through an inductor of a PFC boost stage of the series PFC boost converter; a third input configured to receive an output voltage (MID or OUT) of the PFC boost stage; and a first output configured to provide a pulse width modulated (PWM) signal to a field effect transistor of the PFC boost stage.

In an embodiment, the series PFC boost controller may further include a control circuit configured to use a PFC equation to calculate MULT:

$$MULT = \frac{VEA \times IN}{VRMS^2}$$

wherein: VEA=Voltage Error Amplifier output;

IN=scaled input voltage; and

VRMS=scaled input voltage with low pass filter; and compare MULT with a respective sensed current to result in a respective current error amplifier (CEA) output; and compare the respective CEA output with a sawtooth oscillator output to produce each respective PWM control signal.

In another embodiment of the series PFC boost controller, the control circuit may include an op-amp or a digital controller with an input for a reference voltage, an input for the output voltage of the PFC boost stage, and a VEA output.

In a further embodiment of the series PFC boost controller, the control circuit may include a first multiplier to multiply the VEA output by the scaled input voltage to provide a numerator.

In yet another embodiment of the series PFC boost controller, the control circuit may include a second multiplier to multiply the VRMS by the VRMS to provide a denominator.

In an embodiment of the series PFC boost controller, the control circuit may include a divider to divide the numerator by the denominator to calculate MULT.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
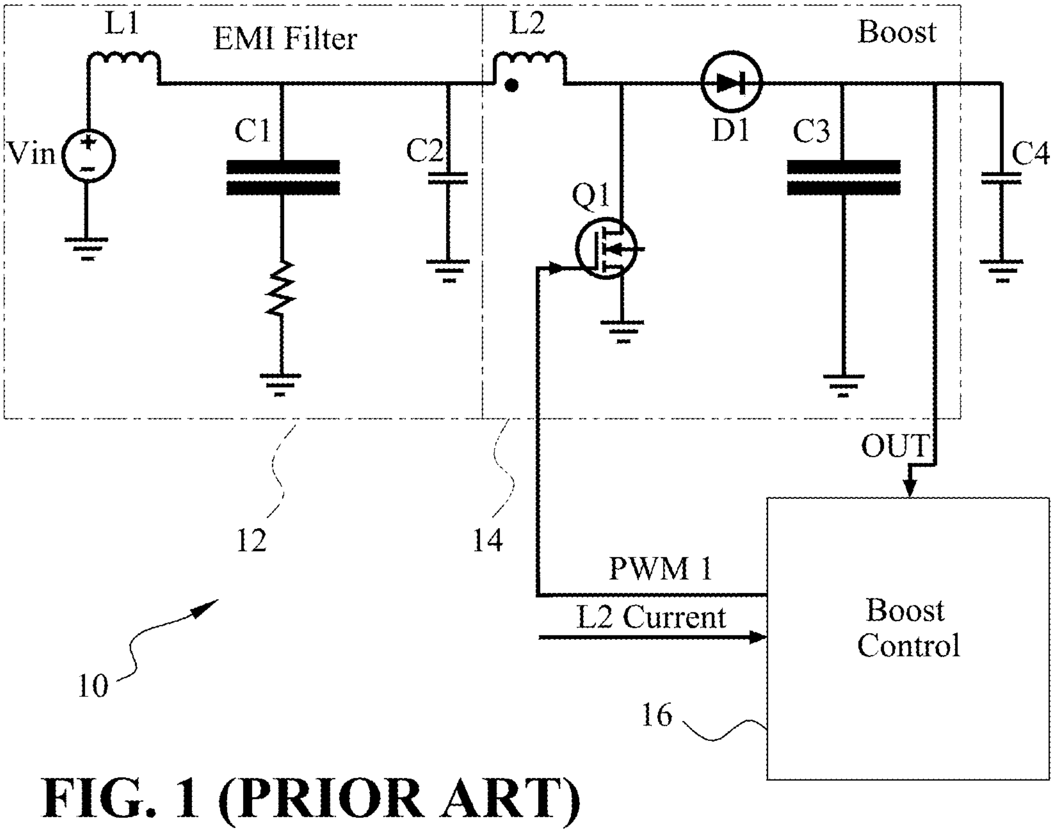
FIG. 1 (PRIOR ART)
FIG. 1 is a schematic view of a prior art boost converter.
Figure 2:
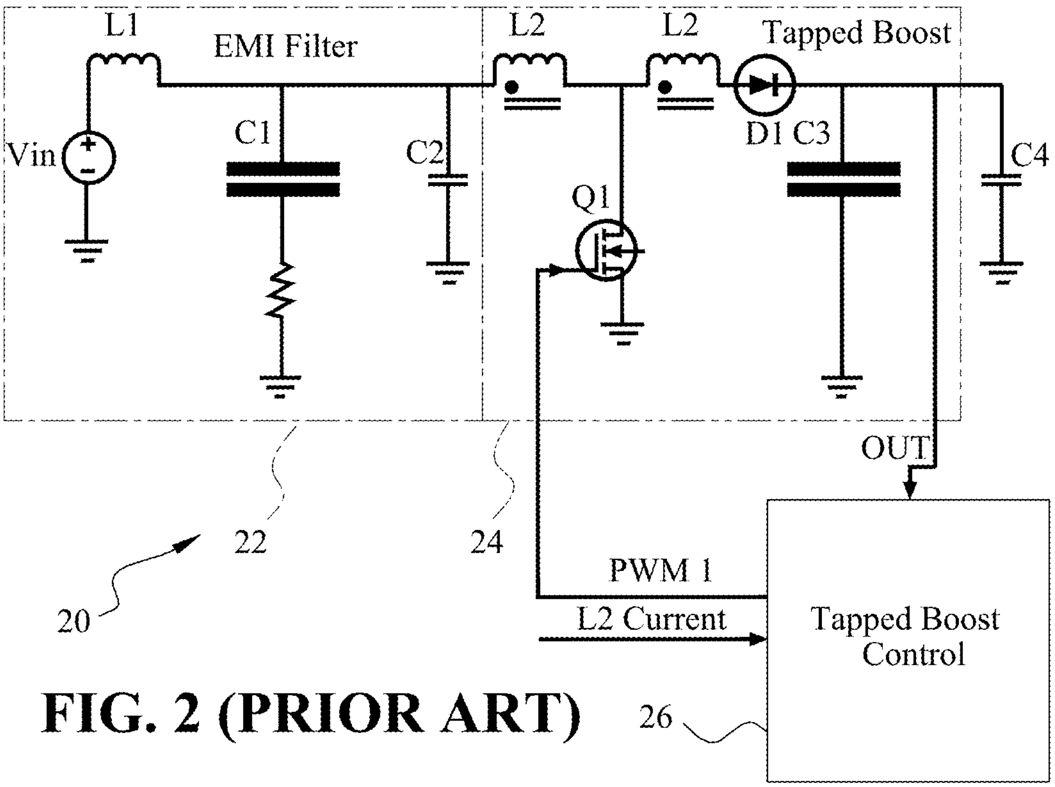
FIG. 2 (PRIOR ART)
FIG. 2 is a schematic view of a prior art tapped-inductor boost converter.
Figure 3:
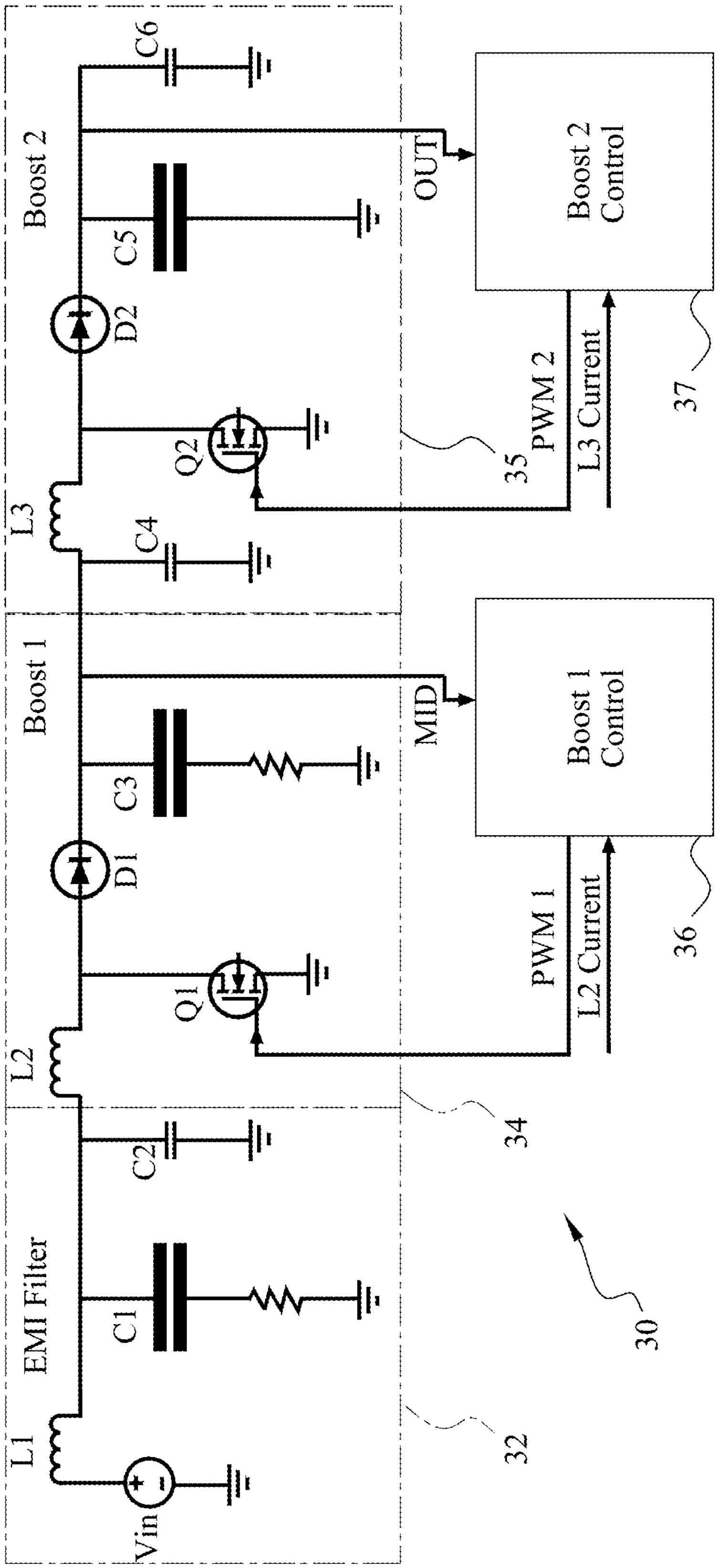
FIG. 3 (PRIOR ART)
FIG. 3 is a schematic view of a prior art series boost converter.

The embodiments of the present disclosure can comprise, consist of, and consist essentially of the features and/or steps described herein, as well as any of the additional or optional ingredients, components, steps, or limitations described herein or would otherwise be appreciated by one of skill in the art.

The following discussion omits or only briefly describes conventional features of the disclosed technology that are apparent to those skilled in the art. Reference to a particular embodiment does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms "a," "an," and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

The devices of the present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. All spatial references, such as, for example, proximal, distal, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior."

It will further be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Various examples of the disclosed technology are provided throughout this disclosure. The use of these examples is illustrative only, and in no way limits the scope and meaning of the invention or of any exemplified form. Likewise, the invention is not limited to any particular preferred embodiment(s) described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

The present disclosure is directed to applying an alternating current (AC) concept of power factor to a direct current (DC) power supply in the form of a series power factor correction boost converter and method for a power supply. Multiple series DC/DC boost converters are controlled using voltage feedback from the filtered voltage input in each converter stage to compensate for the converter's inherent negative impedance as seen by the DC source and achieve a large step-up voltage ratio. Input voltage feedback is utilized by the controllers in all boost converter stages so as to appear resistive and compensate for the DC source impedance, which significantly reduces the amount of damping capacitance needed by the system.

For example, in a boost converter using two boost stages, the novel positive feedback from the voltage input allows both boost stages to regulate in phase with input voltage transients before the outer voltage control loop corrects their outputs. This results in a wider voltage swing on the first boost stage output voltage (MID) during transients, but allows the capacitor C3 of the first boost stage to remain small.

Figure 5:
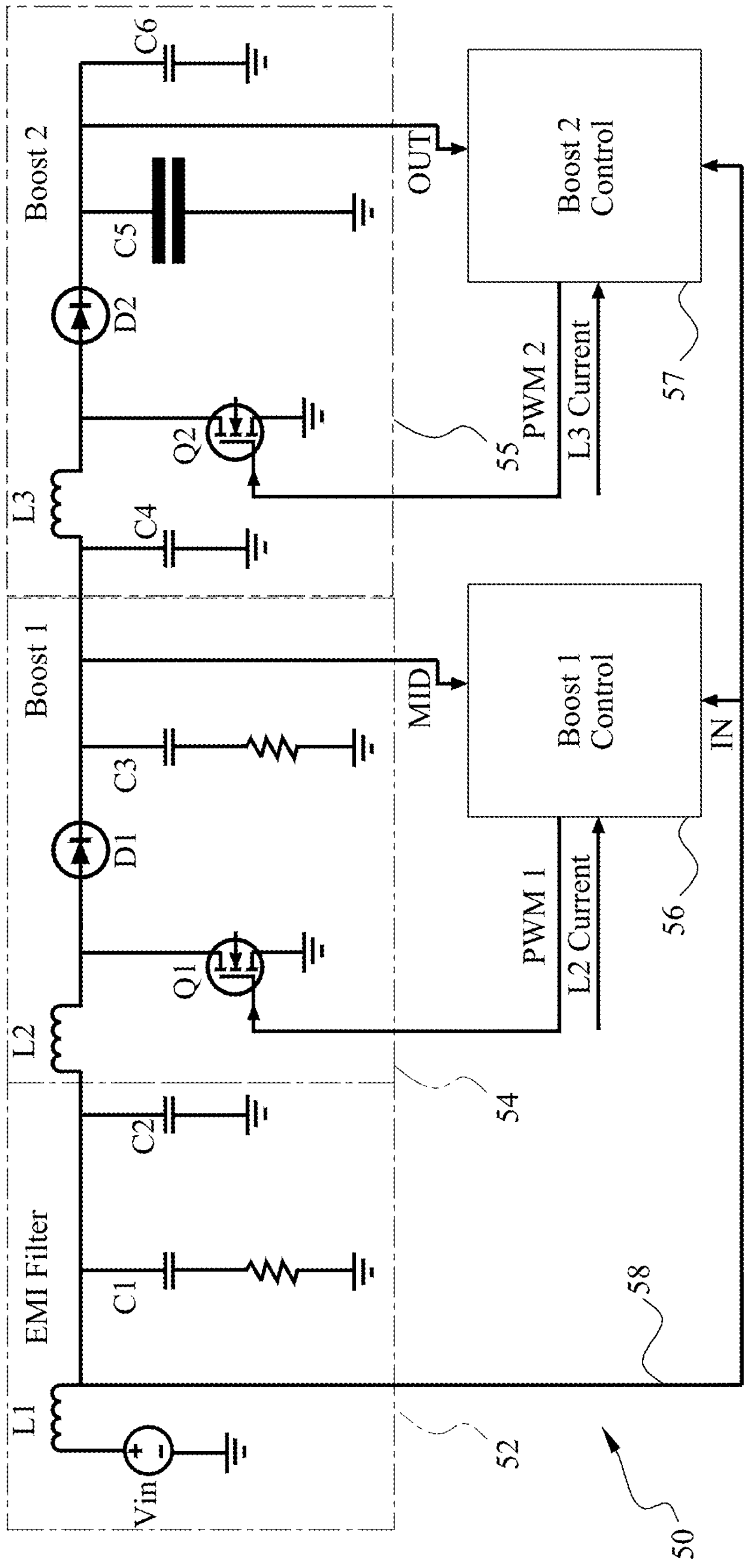
FIG. 5 is a schematic view of a series power factor correction boost converter in accordance with an embodiment of the present disclosure.

Referring to FIG. 5, an example series power factor correction (PFC) boost converter 50 having two boost stages is illustrated. Although illustrated with two boost stages, embodiments in accordance with the present disclosure are not limited thereto, and other embodiments of series PFC boost converter 50 may include three or more stages.

In one or more embodiments, series PFC boost converter 50 includes an EMI filter portion 52, a first PFC boost stage 54, a second PFC boost stage 55, and first and second PFC boost controllers 56 and 57 for first and second PFC boost stages 54 and 55, respectively.

Similar to the EMI filter portions 12, 22, and 32, EMI filter portion 52 of series PFC boost converter 50 receives an input voltage $V_{in}$ that is then passed though inductor L1. EMI filter portion 52 further includes a first capacitor C1 connected to ground through a resistor and a second capacitor C2 connected to ground. However, in contrast to the EMI filter portions 12, 22, and 32, EMI filter portion 52 of the present disclosure provides the L1 voltage via line 58 as feedback IN to each of the first and second PFC boost controllers 56 and 57 of the first PFC boost stage 54 and the second PFC boost stage 55, respectively.

While capacitor C1 in EMI filter portions 12, 22, and 32 is a large capacitor, typically in the form of aluminum electrolytic capacitor, the capacitor C1 in EMI filter portion 52 of series PFC boost converter 50 may be smaller, similar to capacitor C2. Indeed, the capacitor C1 does not need to be large because the use of feedback IN eliminates the effect of the system appearing to have a negative impedance. The filtered voltage from EMI filter portion 52 is sent to the first PFC boost stage 54.

Similar to boost stages 14, 24, and 34, the first PFC boost stage 54 includes a second inductor L2, a first rectifier D1, a third capacitor C3 connected to ground through a resistor, a fourth capacitor C4 connected to ground, and a first field effect transistor (FET) Q1 that receives a pulse width modulated control signal PWM 1 from a first PFC boost controller 56. While capacitor C3 in boost stages 14, 24, and 34 is a large capacitor, typically in the form of aluminum electrolytic capacitor, the capacitor C3 in first PFC boost stage 54 of series PFC boost converter 50 may be smaller, similar to capacitor C4, based upon the use of feedback IN in the control.

The first PFC boost controller 56 receives a voltage MID from the first PFC boost stage 54 downstream from the rectifier D1, the L2 current (also referred to as current sense) from inductor L2, and the L1 voltage via line 58 as feedback IN, and outputs the control signal PWM 1 to first FET Q1. Voltage MID is also fed from first PFC boost stage 54 to second PFC boost stage 55 that is connected in series.

Similar to boost stage 35, the second PFC boost stage 55 includes a third inductor L3, a second rectifier D2, a fifth capacitor C5 connected to ground representing the bulk storage capacitor, a sixth capacitor C6 connected to ground, and a second field effect transistor (FET) Q2 that receives a pulse width modulated control signal PWM 2 from a second PFC boost controller 57.

The second PFC boost controller 57 receives a voltage OUT from the second PFC boost stage 55 downstream from the second rectifier D2, the L3 current (also referred to as current sense) from inductor L3, and the L1 voltage via line 58 as feedback IN, and outputs the control signal PWM 2 to second FET Q2. Voltage OUT is also fed from second PFC boost stage 55 to as the output of the power supply.

Figure 6:
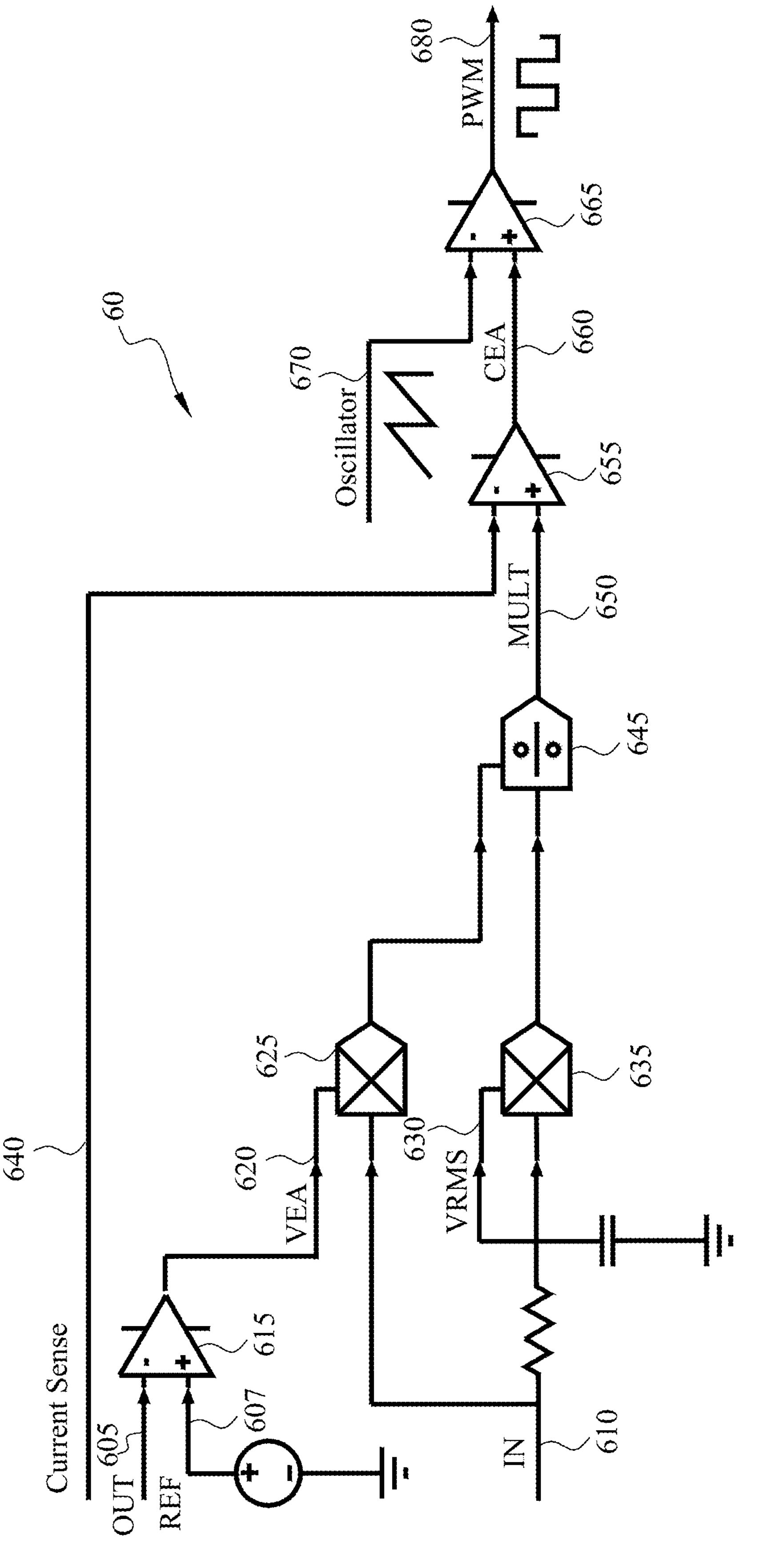
FIG. 6 is a schematic view of a control circuit for performing power factor correction boost control in accordance with an embodiment of the present disclosure.

Referring to FIG. 6, a control circuit 60 for performing power factor correction boost control in accordance with an embodiment of the present disclosure is illustrated schematically. In one or more embodiments, the first PFC boost controller 56 and the second PFC boost controller 57 of FIG. 5 may employ a control circuit 60 in accordance with FIG. 6. In one or more embodiments, a commercially available chip package designed for alternating current (AC) voltage regulation, such as the UC2854B-EP Advanced High-Power Factor Preregulator available from Texas Instruments, may be repurposed and configured for direct current (DC) voltage regulation in accordance with the present disclosure.

Figure 4:
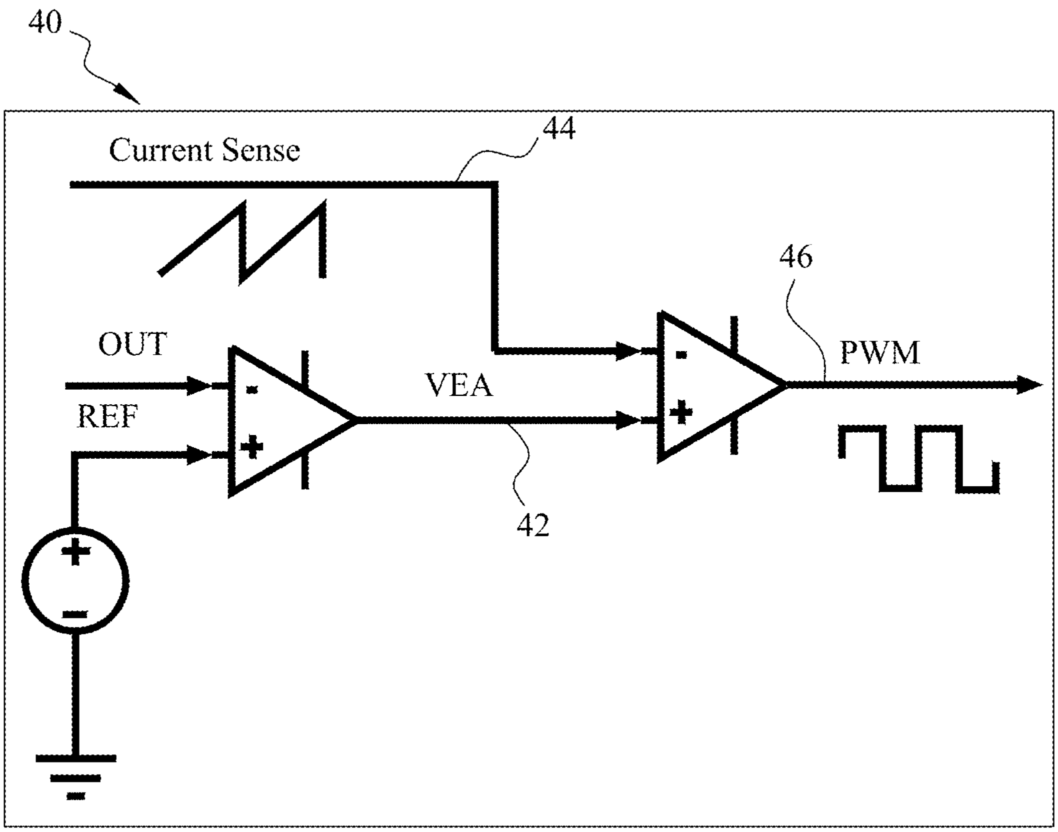
FIG. 4 (PRIOR ART)
FIG. 4 is a schematic view of a prior art peak current mode control circuit.

In contrast to the peak (or average) current control provided by the circuit of FIG. 4, the power factor corrector (PFC) control of control circuit 60 incorporates input feedback into the error signal using the PFC equation:

$$MULT = \frac{VEA \times IN}{VRMS^2} \qquad \text{Equation 1}$$

wherein VEA=Voltage Error Amplifier output (low bandwidth)

IN=scaled input voltage (high bandwidth)

VRMS=scaled input voltage with low pass filter (mid bandwidth)

With reference to FIG. 6, in an embodiment, the control circuit 60 may receive as inputs: a voltage output MID or OUT from a PFC boost stage 54, 55 as voltage OUT 605; the L1 voltage from EMI filter portion 52 via line 58 as feedback in the form of scaled voltage input IN 610; and the L2 or L3 inductor current as current sense 640. Control circuit 60 may also receive a reference voltage REF 607 and an oscillator waveform 670.

The voltage OUT 605 is compared to reference voltage REF 607 at op-amp or digital controller 615 to produce voltage error amplifier output VEA 620. VEA 620 is multiplied by IN 610 at multiplier 625 to get the operator of Equation 1.

The scaled input voltage IN 610 is passed through a resistor of an RC circuit, divided as VRMS 630 and fed to multiplier 635 to get the denominator of Equation 1. The operator and denominator are fed to divider 645 to calculate MULT 650 of Equation 1.

MULT 650 is fed to op-amp or digital controller 655 and compared with the inductor current, current sense 640, to result in the current error amplifier (CEA) output 650. The CEA output 650 is used to set the PWM duty cycle by being compared with a sawtooth oscillator output 670 in op-amp or digital controller 665 to produce the PWM control signal 680, which may then be sent (e.g., as signal PWM 1 or PWM 2) to an FET Q1 or Q2 to control a PFC boost stage 54 or 55.

In one or more embodiments, a series power factor corrector (PFC) boost converter method for providing a direct current (DC) voltage may include providing electromagnetic interference (EMI) filtering of an input DC voltage $V_{in}$ by passing the input DC voltage through a first inductor L1 and to a first PFC boost stage 54 via a line in EMI filter portion 52 having a first capacitor C1 connected to ground through a first resistor, and a second capacitor C2 connected to ground.

The method further includes boosting the DC voltage at the first PFC boost stage 54 through a second inductor L2, a first field effect transistor (FET) Q1, a first rectifier D1, a third capacitor C3 connected to ground through a second resistor, and a fourth capacitor C4 connected to ground.

The method boosts the DC voltage at a second PFC boost stage 55 through a third inductor L3, a second FET Q2, a second rectifier D2, a fifth capacitor C5 connected to ground, and a sixth capacitor C6 connected to ground.

The method controls the first PFC boost stage 54 with a first PFC boost controller 56 having inputs receiving the input voltage IN, a first sensed current across the second inductor (L2 current), and a first output voltage MID of the first PFC boost stage, and outputs a first pulse width modulated (PWM) signal PWM 1 to the first FET Q1.

The method controls the second PFC boost stage 55 with a second PFC boost controller 57 having inputs receiving the input voltage IN, a second sensed current across the third inductor (L3 current), and a second output voltage OUT of the second PFC boost stage, and outputs a second PWM signal PWM 2 to the second FET Q2.

In one or more embodiments, each of the first and second PFC boost controllers 56 and 57 use a PFC equation to calculate MULT:

$$MULT = \frac{VEA \times IN}{VRMS^2}$$

wherein: VEA=Voltage Error Amplifier output;

IN=scaled input voltage; and

VRMS=scaled input voltage with low pass filter.

Respective PFC boost controllers 56 and 57 compare MULT 650 with a respective sensed current 640 to result in a respective current error amplifier (CEA) output 660, and compare the respective CEA output 650 with a sawtooth oscillator output 670 to produce each respective PWM control signal 680.

In the method, each respective PFC boost controller 56 and 57 receives an input for a reference voltage REF 607, an input for the respective output voltage OUT 605 of a respective PFC boost stage 54 or 55, and calculates a VEA output 620.

The method may further include each respective PFC boost controller 56 and 57 multiplying the VEA output 620 by the scaled input voltage IN 610 to provide a numerator. Each respective PFC boost controller 56 and 57 may then multiply the VRMS 630 by the VRMS 630 to provide a denominator, and then each respective PFC boost controller 56 and 57 divides the numerator by the denominator to calculate MULT 650.

One or more embodiments may also be drawn to a series power factor corrector (PFC) boost controller 56, 57 for a direct current (DC) power supply that includes a control circuit 60. The PFC boost controller 56, 57 includes a first input configured to receive an input voltage IN of a series PFC boost converter 50 from an electromagnetic interference (EMI) filter 52 of the series PFC boost converter 50. It also includes a second input configured to receive a sensed current across an inductor L2, L3 of a PFC boost stage 54, 55 of the series PFC boost converter 50, a third input configured to receive an output voltage MID, OUT of the PFC boost stage 54, 55, and a first output configured to provide a pulse width modulated (PWM) signal PWM 1, PWM 2 to a field effect transistor Q1, Q2 of the PFC boost stage 54, 55.

In various embodiments, the PFC boost converter 56, 57 may include a control circuit 60 configured to use a PFC equation to calculate MULT 650:

$$MULT = \frac{VEA \times IN}{VRMS^2}$$

wherein: VEA=Voltage Error Amplifier output;

IN=scaled input voltage; and

VRMS=scaled input voltage with low pass filter; and compare MULT 650 with a respective sensed current 640 to result in a respective current error amplifier (CEA) output 660; and compare the respective CEA output 660 with a sawtooth oscillator output670 to produce each respective PWM control signal 680.

In an embodiment, the control circuit 60 may include an op-amp or a digital controller 615 with an input for a reference voltage REF 607, an input for the output voltage OUT 605 of the PFC boost stage 54. 55, and a VEA output 620.

The control circuit 60 may also include a first multiplier 625 to multiply the VEA output 620 by the scaled input voltage IN 610 to provide a numerator. The control circuit 60 may also include a second multiplier 635 to multiply the VRMS 630 by the VRMS 630 to provide a denominator, as well as a divider 645 to divide the numerator by the denominator to calculate MULT 650.

Embodiments in accordance with the present disclosure have several advantages since capacitive energy storage is concentrated in the final voltage output. For example, capacitors generally have better energy density (J/m^3) at higher voltages, so less space and weight are required for equivalent energy storage at higher voltages. Additionally, capacitors have lower Farads at higher voltages due to the $E=0.5*Capacitance*Voltage^2$ equation.

Such differences are significant because input voltage passes through the boost converter's rectifier and charges the boost's output voltage even when the converter is non-operational. When input voltage is applied, all capacitance on the boost's input and output will charge to the input voltage. This "inrush" turn on current often needs to be controlled to limit peak current draw from the input power source, and the inrush control circuit's size and complexity grows proportionally to the amount of Farads which need to be charged. For example, a 10V, 1 F capacitor's energy storage is equal to a 100V, 0.01 F capacitor. Therefore, placing bulk capacitance at the final stage minimizes the amount of inrush current which needs to be controlled.

Moreover, capacitance placed at the boost converter's input usually requires damping to limit the EMI filter's Q-factor and reduce input current ripple when input voltage is perturbated in audio conducted susceptibility testing. The damping elements are often dissipative and burn more power as line capacitance increases. Minimizing this capacitance reduces the amount of dissipation due to damping and reduces the amount of ripple current injected during audio conducted susceptibility testing. The input damping capacitance in accordance with the present disclosure can be reduced because the boost converter's control method responds to the input voltage and lets the boost converter act as the damping element.

Liquid-electrolyte capacitors, such as aluminum electrolytic capacitors, are most used for bulk capacitance, and are often the limiting factor to a power supply's lifetime since the electrolyte outgasses during their operation. In accordance with the present disclosure, the present control method may reduce the number of bulk capacitors to obtain equivalent energy storage, improving reliability by reducing possible points of failure.

Compared to a tapped-boost converter, the series PFC boost converter of the present disclosure has the following advantages. The tapped-boost converter requires a coupled inductor with parasitic leakage inductance and a chopped input current waveform. The parasitic leakage inductance causes additional voltage ringing on the semiconductors which drives higher voltage-rated components with lower figure of merit and emissions which may require damping. Both effects reduce efficiency of the tapped boost and add EMI risk. Additionally, semiconductor voltage stress limits the practical step-up ($V_{output}/V_{input}$) ratio of a tapped-boost converter to a lower value than can be obtained by series PFC boost stages in accordance with the present disclosure.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A series power factor corrector (PFC) boost converter for providing a direct current (DC) voltage, comprising:

- an electromagnetic interference (EMI) filter including a first inductor, a first capacitor connected to ground through a first resistor, and a second capacitor connected to ground, the EMI filter configured to receive an input voltage and pass it through the first inductor;
- a first PFC boost stage with a first input connected to an output of the EMI filter, the first PFC boost stage including a second inductor, a first field effect transistor, a first rectifier, a third capacitor connected to ground through a second resistor, and a fourth capacitor connected to ground;
- a second PFC boost stage with a second input connected to an output of the first PFC boost stage, the second PFC boost stage including a third inductor, a second field effect transistor, a second rectifier, a fifth capacitor connected to ground, and a sixth capacitor connected to ground;
- a first PFC boost controller having inputs configured to receive the input voltage (IN), a first sensed current through the second inductor, and a first output voltage (MID) of the first PFC boost stage, the first PFC boost controller further having a first output to provide a first pulse width modulated (PWM) signal to the first field effect transistor; and
- a second PFC boost controller having inputs configured to receive the input voltage (IN), a second sensed current through the third inductor, and a second output voltage (OUT) of the second PFC boost stage, the second PFC boost controller further having a second output to provide a second PWM signal to the second field effect transistor.

2. The series PFC boost converter of claim 1, wherein each of the first and second PFC boost controllers comprises a respective control circuit configured to use a PFC equation to calculate MULT:

$$MULT = \frac{VEA \times IN}{VRMS^2}$$

wherein: VEA=Voltage Error Amplifier output;

IN=scaled input voltage; and

VRMS=scaled input voltage with low pass filter; and compare MULT with a respective sensed current to result in a respective current error amplifier (CEA) output; and compare the respective CEA output with a sawtooth oscillator output to produce each respective PWM control signal.

3. The series PFC boost converter of claim 2, wherein each respective control circuit comprises an op-amp or a digital controller with an input for a reference voltage, an input for the respective output voltage of a respective PFC boost stage, and a VEA output.

4. The series PFC boost converter of claim 3, wherein each respective control circuit comprises a first multiplier to multiply the VEA output by the scaled input voltage to provide a numerator.

5. The series PFC boost converter of claim 4, wherein each respective control circuit comprises a second multiplier to multiply the VRMS by the VRMS to provide a denominator.

6. The series PFC boost converter of claim 5, wherein each respective control circuit comprises a divider to divide the numerator by the denominator to calculate MULT.

7. The series PFC boost converter of claim 1, wherein each of the first and second PFC boost stages includes:

- the respective inductor connected in series with the respective rectifier;
- the respective field effect transistor connected to ground between the inductor and rectifier; and
- the respective capacitors connected to ground between the rectifier and the output of the respective PFC boost stage.

8. The series PFC boost converter of claim 7, wherein respective output voltages input to respective PFC boost controllers are taken from between respective capacitors of each PFC boost stage.

9. A series power factor corrector (PFC) boost converter method for providing a direct current (DC) voltage, comprising:

- providing an input DC voltage to a first PFC boost stage as an input voltage (IN);
- boosting the DC voltage at the first PFC boost stage through a second inductor, a first field effect transistor, a first rectifier, a third capacitor connected to ground, and a fourth capacitor connected to ground;
- boosting the DC voltage at a second PFC boost stage through a third inductor, a second field effect transistor, a second rectifier, a fifth capacitor connected to ground, and a sixth capacitor connected to ground;
- controlling the first PFC boost stage with a first PFC boost controller having inputs receiving the input voltage (IN), a first sensed current through the second inductor, and a first output voltage (MID) of the first PFC boost stage, and outputting a first pulse width modulated (PWM) signal to the first field effect transistor; and
- controlling the second PFC boost stage with a second PFC boost controller having inputs receiving the input voltage (IN), a second sensed current through the third inductor, and a second output voltage (OUT) of the second PFC boost stage, and outputting a second PWM signal to the second field effect transistor.

10. The method of claim 9, wherein providing the input DC voltage includes:

- providing electromagnetic interference (EMI) filtering of the input DC voltage by passing the input DC voltage through a first inductor and to the first PFC boost stage via a line having a first capacitor connected to ground through a first resistor, and a second capacitor connected to ground.

11. The method of claim 9, wherein each of the first and second PFC boost controllers use a PFC equation to calculate MULT:

$$MULT = \frac{VEA \times IN}{VRMS^2}$$

wherein: VEA=Voltage Error Amplifier output;

IN=scaled input voltage; and

VRMS=scaled input voltage with low pass filter; and compare MULT with a respective sensed current to result in a respective current error amplifier (CEA) output; and compare the respective CEA output with a sawtooth oscillator output to produce each respective PWM control signal.

12. The method of claim 11, wherein each respective PFC boost controller receives an input for a reference voltage, an input for the respective output voltage of a respective PFC boost stage, and calculates a VEA output.

13. The method of claim 12, wherein each respective PFC boost controller multiplies the VEA output by the scaled input voltage to provide a numerator, and each respective PFC boost controller multiplies the VRMS by the VRMS to provide a denominator.

14. The method of claim 13, wherein each respective PFC boost controller divides the numerator by the denominator to calculate MULT.

15. A series power factor corrector (PFC) boost controller for a direct current (DC) power supply, comprising:

a first input configured to receive an input voltage (IN) of a series PFC boost converter from an electromagnetic interference (EMI) filter of the series PFC boost converter;

a second input configured to receive a sensed current through an inductor of a PFC boost stage of the series PFC boost converter;

a third input configured to receive an output voltage (MID or OUT) of the PFC boost stage; and a first output configured to provide a pulse width modulated (PWM) signal to a field effect transistor of the PFC boost stage.

16. The PFC boost converter of claim 15, further comprising a control circuit configured to use a PFC equation to calculate MULT:

$$MULT = \frac{VEA \times IN}{VRMS^2}$$

wherein: VEA=Voltage Error Amplifier output;

IN=scaled input voltage; and

VRMS=scaled input voltage with low pass filter; and compare MULT with a respective sensed current to result in a respective current error amplifier (CEA) output; and compare the respective CEA output with a sawtooth oscillator output to produce each respective PWM control signal.

17. The PFC boost controller of claim 16, wherein the control circuit comprises an op-amp or a digital controller with an input for a reference voltage, an input for the output voltage of the PFC boost stage, and a VEA output.

18. The PFC boost controller of claim 17, wherein the control circuit comprises a first multiplier to multiply the VEA output by the scaled input voltage to provide a numerator.

19. The PFC boost controller of claim 18, wherein the control circuit comprises a second multiplier to multiply the VRMS by the VRMS to provide a denominator.

20. The PFC boost controller of claim 19, wherein the control circuit comprises a divider to divide the numerator by the denominator to calculate MULT.

* * * * *